UNITED STATES PATENT OFFICE 2,211,467

HALO-PHENYLBENZOATES AND PROCESS FOR PRODUCING THE SAME

Richard H. Kimball and Anthony Loverde, Niagara Falls, N. Y., assignors to Hooker Electrochemical Company, New York, N. Y., a corporation of New York No Drawing. Application September 24, 1938, Serial No. 231,613

12 Claims. (Cl. 260—476)

Phenylbenzoate is the phenyl ester of benzoic acid, having the formula:

$$C_6H_5OOCC_6H_5 \qquad (1)$$

This compound is produced by condensing phenol with a benzoyl halide, such as benzoyl chloride, the chlorine of the benzoyl chloride splitting off with the hydrogen of the hydroxyl group and causing the two side chains to join.

In the chlorination of phenylbenzoate there is no known method of controlling the distribution of the chlorine, as between the phenyl and benzoate groups. Beyond the point corresponding to trichlorphenylbenzoate, the product tends to go to black, solid, intractible resins, which cannot be distilled without decomposition. The yield of the higher chlorinated, stable chlorphenylbenzoates is, on this account, obviously low.

In the process of our invention, therefore, either the phenol or the benzoyl chloride is chlorinated, by substitution of chlorine for hydrogen in the carbon ring, and condensed with the other, or both are chlorinated and the resulting products condensed together, to form chlor-phenylbenzoate. In this way we are able absolutely to control the distribution of the chlorine as between the two groups, hence to obtain mixtures of isomers and produce a great variety of low melting products. Our products are, therefore, of the general formula:

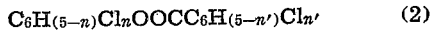

$$C_6H_{(5-n)}Cl_nOOCC_6H_{(5-n')}Cl_{n'} \qquad (2)$$

Chlorphenyl-benzoates, produced by chlorinating phenol in the carbon ring and condensing it with benzoyl chloride, are known, but to the best of our knowledge and belief, they have only been produced as products incidental to theoretical studies of chlorinated phenol and have, consequently, never become articles of commerce. Recrystallized chlorphenyl-benzoates are, in general, white crystalline solids.

Phenyl-chlorbenzoates, produced by chlorinating benzoyl chloride in the carbon ring and condensing it with phenol, and chlorphenyl-chlorbenzoates, produced by reacting chlorphenol with chlorbenzoyl chloride, are new, so far as we are aware.

The chlorination of phenol with or without a catalyst, or of benzoyl chloride, with a catalyst, such as molybdenite, SbCl₃ or FeCl₃ is relatively simple. Phenol may be chlorinated at between 50° and 130° C. and benzoyl chloride at between 120° and 180° C. No catalyst is necessary for the condensation of chlorphenol with chlorbenzoyl chloride, although the presence of the catalyst used in the previous chlorinations is unobjectionable.

In the carrying out of our condensation reaction, we heat the chlorphenol to between 100° and 150° C. and pour in the chlorbenzoyl chloride slowly, with stirring. For highest yield, the reagents should be in equimolecular proportions. The temperature is then raised to between 150° and 200° C. and held at that temperature until the reaction is substantially complete. In order to remove residual reagents or other impurities, the product may then be purified in various ways, such as by blowing with air or steam; or it may be washed with dilute aqueous HCl, followed by a washing with a solution of Na₂CO₃ and with water; or it may be washed with an alcohol, such as methanol, with refluxing and vigorous agitation. This alcohol dissolves out residual chlorphenol and reacts with residual chlorbenzoyl chloride to form the corresponding methyl ester. The alcohol, containing the catalyst and a large part of the residual reagents, as such or as methyl ester, is then allowed to form a supernatant layer, from which the product is drawn off. This washing may be repeated several times. Any residual alcohol or other volatile impurities may then be removed by blowing with air or steam. The product may be used without further treatment or it may be further purified by distillation under vacuum.

Our distilled products are clear bodies of amber color, ranging from viscous amber liquids to semi-crystalline waxy solids, or white, granular crystalline solids upon recrystallization.

Example I

Phenol was chlorinated at 90° to 110° C. in presence of 0.1 per cent FeCl₃ to a specific gravity of 1.600 at 60° C., which corresponds to a chlorine content of 3½ atoms to each molecule. Benzoyl chloride was chlorinated at 140° to 170° C. in presence of 0.1 per cent FeCl₃ to a specific gravity of 1.430 at 25° C., which corresponds to a chlorine content of 1½ atoms in the carbon ring to each molecule. Holding the chlorinated phenol at 110° to 120° C., the chlorinated benzoyl chloride was introduced during a period of one-half hour, with stirring. HCl was evolved. The product was raised to 150° C. and held at that temperature for one hour, with agitation. It was then cooled to 60° C. One fifth of its volume of methanol was added, with vigorous agitation and refluxing at 66° C. This was continued for half an hour. The mixture was allowed to settle and the top layer drawn off. The agitating and settling were repeated twice, the final agitation continuing for only 15 minutes. A test after the last washing showed the alcohol to be free from iron chloride. The residual liquid product was air blown for two hours at 80° to 100° C. to remove volatile impurities. The yield at this point was 95 per cent. The product was a viscous liquid, of dark amber color, having a chlorine content of 47.9 per cent, corresponding substantially to penta-chlorphenylbenzoate, and a specific gravity of 1.520 at 70° C.

The product was then distilled at an absolute pressure of about 12 mm. An initial fraction, amounting to only about four per cent of the whole, was discarded. The fraction distilling between 220° and 260° C. was collected. This fraction was washed again with methanol and air blown. The yield of distilled pentachlor-phenyl-benzoate was 82½ per cent. This product was a clear, amber, very viscous liquid at ordinary temperatures, having a chlorine content of 48.9 per cent and a specific gravity of 1.533 at 70° C.

The methanol used for washing and drawn off after settling was treated with caustic soda and the methanol distilled off. A large proportion of the methanol was thus recovered in a state fit for reuse.

*Example II*

Phenol was chlorinated at 60° to 70° C. until its weight had increased to 2.3 times its original weight, which corresponds to the introduction of an average of 3.54 atoms of chlorine per molecule. Benzoyl chloride was chlorinated at 130° to 140° C. until its weight had increased to 1.36 times its original weight, corresponding to the introduction of an average of 1.46 atoms of chlorine per molecule. These two products were condensed together at 110° C. and the resulting compound raised to and held at 150° C. for one hour. After cooling it was washed twice with methanol. The product was separated from the alcohol, heated under vacuum and blown with air. The yield of product was 98 per cent.

*Example III*

Phenol was chlorinated at 85° to 95° C., without a catalyst, to a gain in weight corresponding to an average chlorine content of 2 atoms per molecule. The resulting product was condensed with benzoyl chloride as in Example I, and the resulting mixture air blown for 20 minutes at 150°. It was distilled under reduced pressure. A lower boiling fraction representing 22 per cent of the material and containing much unchanged benzoyl chloride was collected first, and reserved for recycling. The main body was collected at 190° to 210° under 15 mm. absolute pressure and air blown for two hours. The yield was 75 per cent. The product was a yellowish liquid which quickly solidified to a yellow-white waxy-opaque solid, melting at approximately 88.5° C. and having a pungent odor resembling the chlorphenols. The product contained 24.3 per cent chlorine, against 26.55 per cent required for dichlor-phenyl-benzoate.

*Example IV*

Benzoyl chloride was chlorinated in the presence of molybdenite at 150 to 250° C. until it would absorb no more chlorine. The resulting product was condensed with phenol and purified by recrystallization. The product was a white crystalline granular solid melting at 118° C., containing 46.2 per cent chlorine.

*Example V*

Benzoyl chloride was chlorinated in presence of ferric chloride until its weight had increased to 1.57 times its original weight. Its specific gravity was then 1.549 at 20° C. and its chlorine content in the ring 37.45 per cent. 418 grams of this product were condensed with 184 grams phenol at 120° to 130° C. The temperature was raised to 150° C. and held at that temperature for about one hour. The product was an oily dark orange red liquid, having a specific gravity of 1.380 at 25° C.

This product was distilled at 230° to 240° C. under an absolute pressure of 19 mm. The distilled product was an orange yellow oily liquid having a specific gravity of 1.376 at 25° C. and a chlorine content of 30.11, corresponding to about 2.52 chlorine atoms per molecule.

*Example VI*

Benzoyl chloride was chlorinated in presence of ferric chloride until its weight had increased to 2.03 times its original weight, finishing at 200° C. Its specific gravity was 1.727 at 20° C. and its chlorine content in the ring 52 per cent. 568 grams of this product was condensed with 184 grams of phenol at 120° to 130° C. The product was raised to 150° C. and held at that temperature for about one hour. The crude product was a reddish brown crystalline material melting at 71° C.

This product was distilled at 270° to 300° C. under an absolute pressure of 20 mm. The distilled product was a yellowish white crystalline material melting at 86.9° C. and having a chlorine content of 44.32 per cent, corresponding to about 4.45 atoms of chlorine per molecule.

*Example VII*

Phenol was chlorinated without a catalyst at a temperature of 80° rising to 140° until an amount of chlorine had been absorbed corresponding to 2 atoms per molecule. Benzoyl chloride was chlorinated in the presence of ferric chloride at a temperature of 35° rising to 120° C. until an amount of chlorine had been absorbed corresponding to 2 atoms per molecule. The resulting products were condensed together with the aid of heat, and the resulting material was washed repeatedly with hot dilute hydrochloric acid until free from iron, then with sodium carbonate solution and finally with hot water. Steam was then blown through the material at 100° C. to remove any volatile impurities. The product was dried by blowing air through under partial vacuum at 100°. The resulting product was a dark colored viscous liquid, in which a few isolated crystals had appeared after a year. The chlorine content was 50 per cent.

A portion of the product was distilled and the main body, distilling at 250 to 290° C. under 12 mm. absolute pressure, collected. It was air blown for several hours at 100°. The product was a light amber viscous liquid, very similar to that of Example I. However, unlike the product of Example I, upon standing one month, it solidified to a yellow, semi-crystalline mass, melting below 100° C. Upon melting, it quickly re-solidified. The chlorine content was 49.5 per cent.

*Example VIII*

Phenol was chlorinated at 60° to 70° in the presence of 0.1 per cent of ferric chloride to a gravity corresponding to 3.5 atoms of chlorine per molecule. Benzoyl chloride was chlorinated at 130° to 140° in the presence of 0.1 per cent ferric chloride to a gravity corresponding to 2.7 atoms of chlorine per molecule. These two products were condensed together at 110° to 120° C. The temperature was then raised and held at 150° C. for 45 minutes. The product was purified as in Example I, yielding a dark colored liquid having a viscosity of 523 seconds Saybolt at 60° C., with a chlorine content of 53.0 per cent, corresponding to substantially hexachlor-phenylbenzoate. The yield of undistilled product was 96 per cent.

This product was then distilled under reduced pressure. About 3 per cent distilled under 255° C. and was discarded. More than 90 per cent distilled between 255° and 325° C. at 15 mm. pressure. The distilled product was a light amber liquid having a viscosity of 548 seconds Saybolt at 60° C., with a chlorine content of 52.9 per cent. The yield was 88 per cent.

In general, our products tend to solidify by crystallization upon standing several months. However, the product of Example I, namely pentachlor-phenylbenzoate having its chlorine divided between the two groups in the proportions of 3½ chlorine atoms in the carbon ring of the phenol to 1½ in that of the benzoyl chloride, appears to be exceptional. These proportions appear to be critical, resulting in a product that remains liquid indefinitely at room temperature.

The products are useful as dielectrics, as plasticizers for gums and resins and as ingredients for compositions to be used for coating or impregnating fibrous materials in order to render them more weather-proof and fire resistant.

Another use for our chlor-phenylbenzoates is as addition agents for lubricants. It is now well known that chlorinated hydrocarbons, when dissolved in mineral lubricating oils have the property of greatly increasing the oil film strength, or load carrying capacity, of such oils. Many of these chlorinated hydrocarbons, and particularly those capable of being highly chlorinated, are of limited solubility in mineral oils. Certain others are miscible with such oils, but these in general are of relatively low chlorine content. The latter are, moreover, generally relatively unstable, consequently suitable for use only at moderate temperatures. Our chlor-phenylbenzoates, on the other hand, are stable at temperatures up to 300° C. Our pentachlor-phenylbenzoate having chlorine in both groups in the proportion of 3½ in the phenol group to 1½ in the benzoate group, which is theoretically a mixture of a large number of isomers and contains 47.8 per cent chlorine, is miscible with all mineral oils and a very desirable product.

What we claim is:

1. The process for production of halo-phenylbenzoates which comprises halogenating at least one member of the group consisting of phenol and benzoyl halide, by substitution of halogen for hydrogen in the carbon ring, and then condensing molecules of said phenyl compound each with a molecule of said benzoyl compound, with elimination of hydrogen halide between said molecules.

2. The process for production of halo-phenylbenzoates which comprises chlorinating phenol and benzoyl halide separately, by substitution of halogen for hydrogen in their respective carbon rings, and then condensing molecules of one of the resulting products each with a molecule of the other resulting product, with elimination of hydrogen halide between said molecules.

3. The process for production of chlor-phenylbenzoates which comprises chlorinating phenol and benzoyl halide separately, by substitution of chlorine for hydrogen in their respective carbon rings, and then condensing molecules of one of the resulting products each with a molecule of the other resulting product, with elimination of hydrogen halide between said molecules.

4. The process for production of pentachlorphenylbenzoates which comprises chlorinating phenol and benzoyl halide separately, by substitution of chlorine for hydrogen in their respective carbon rings, to an average total of five chlorine atoms in two rings, including one ring of each compound, and then condensing molecules of one of the resulting products each with a molecule of the other resulting product, with elimination of hydrogen halide between said molecules.

5. The process for production of chlor-phenylbenzoates which comprises chlorinating phenol and benzoyl halide separately, by substitution of chlorine for a part of the hydrogen in their respective carbon rings, to produce a mixture of isomers, and then condensing molecules of one of the resulting products each with a molecule of the other resulting product, with elimination of hydrogen halide between said molecules.

6. The process for production of chlor-phenylbenzoates which comprises chlorinating phenol and benzoyl halide separately in presence of ferric chloride, and then condensing molecules of one of the resulting products each with a molecule of the other resulting product, with elimination of hydrogen halide between said molecules.

7. The process for production of chlor-phenylbenzoates which comprises chlorinating phenol and benzoyl halide separately in presence of ferric chloride, heating the resulting products together in substantially equimolecular proportions, adding an alkyl alcohol, agitating and refluxing, allowing the resulting mixture to cool and separate, drawing off the supernatent layer and blowing the product with air.

8. The process for production of chlor-phenylbenzoates which comprises chlorinating phenol and benzoyl halide separately in presence of ferric chloride, heating the resulting products together in substantially equimolecular proportions, adding an alkyl alcohol, agitating and refluxing, allowing the resulting mixture to cool and separate, drawing off the supernatent layer, blowing the product with air, and distilling the product.

9. The process for production of chlor-phenylbenzoates which comprises chlorinating phenol at 50° to 130° C. in presence of ferric chloride, separately chlorinating benzoyl chloride at 120° to 180° C. in presence of ferric chloride, stirring said chlorinated benzoyl chloride into said chlorinated phenol slowly at 100° to 150° C., raising the mixture to between 150° C. and 200° C. and holding it at that temperature until reaction is substantially complete, cooling the products to about 60° C., adding methyl alcohol, with agitation, refluxing said alcohol, allowing the resulting mixture to cool and separate and drawing off the supernatent layer.

10. The process for production of chlor-phenylbenzoates which comprises chlorinating phenol at 90° to 110° C. in presence of ferric chloride to a gravity of substantially 1.600 at 60° C., separately chlorinating benzoyl chloride at 140° to 170° C. in presence of iron chloride to a gravity of substantially 1.430 at 25° C., stirring said chlorinated benzoyl chloride into said chlorinated phenol slowly at 110° C. to 120° C., raising the mixture to substantially 150° C. and holding it at that temperature until the reaction is substantially complete, cooling the products to substantially 60° C., adding methyl alcohol, with agitation, refluxing said alcohol, allowing the resulting mixture to cool and separate and drawing off the supernatent layer.

11. As a new composition of matter, phenyl-chlorbenzoate such as would be produced by chlorinating benzoyl halide, by substitution of chlorine for hydrogen in the carbon ring and then condensing molecules of the resulting product each with a molecule of phenol, with elimination of hydrogen halide between said molecules.

12. As a new composition of matter, white crystalline phenyl-pentachlorbenzoate.

RICHARD H. KIMBALL.
ANTHONY LOVERDE.